INVENTOR.
OLIVER V. PHILLIPS

Nov. 18, 1958     O. V. PHILLIPS     2,860,509
RECORDING APPARATUS FOR EARTH BORE DRILLING
Filed Oct. 18, 1954     5 Sheets-Sheet 2
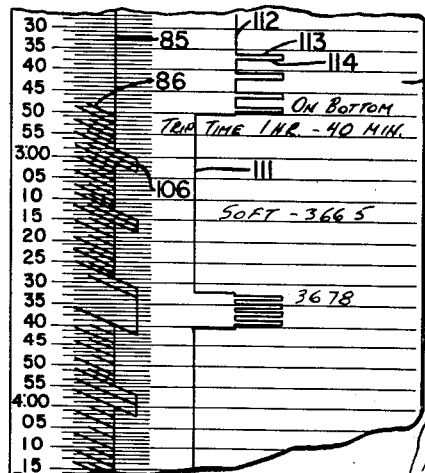
FIG. 2.
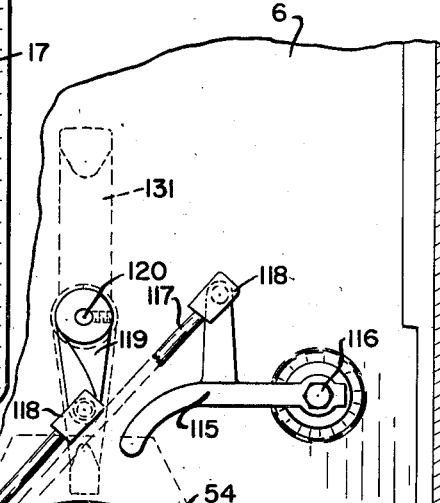
FIG. 6.
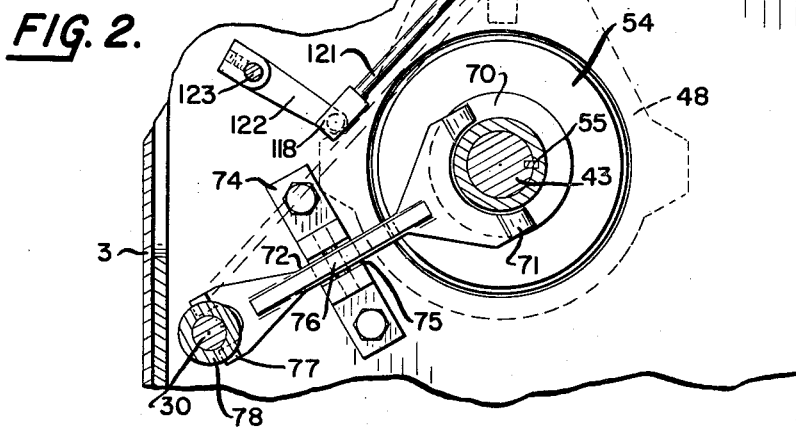
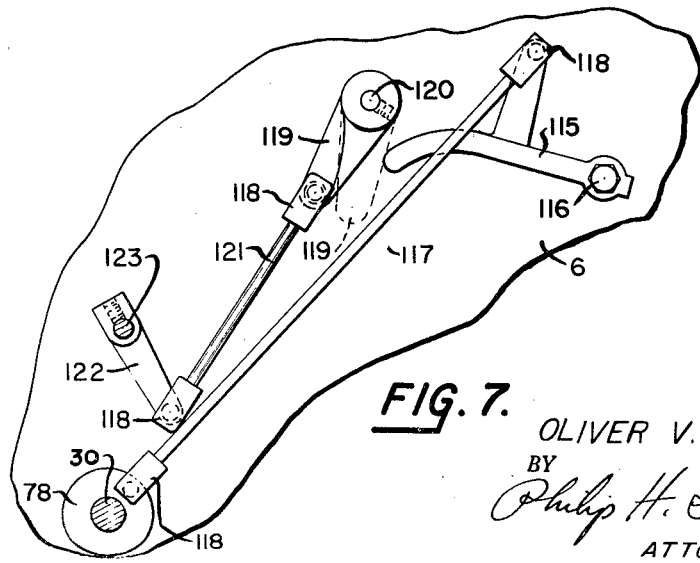
FIG. 7.
INVENTOR.
OLIVER V. PHILLIPS
BY
Philip H. Sheridan
ATTORNEY

INVENTOR.
OLIVER V. PHILLIPS
ATTORNEY

Nov. 18, 1958     O. V. PHILLIPS     2,860,509
RECORDING APPARATUS FOR EARTH BORE DRILLING
Filed Oct. 18, 1954     5 Sheets-Sheet 4
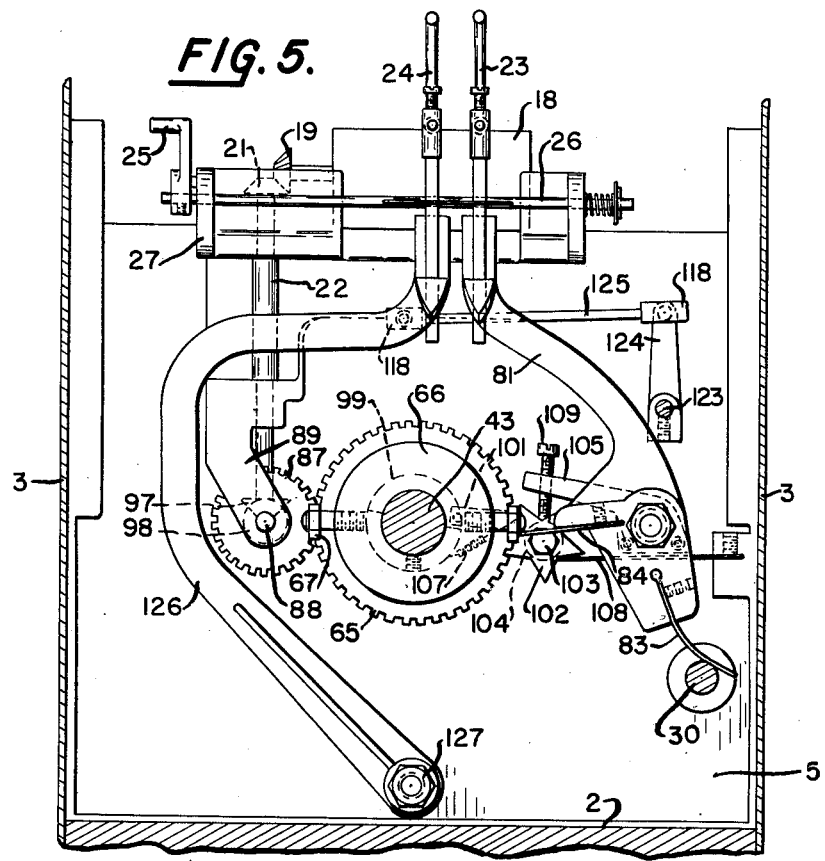
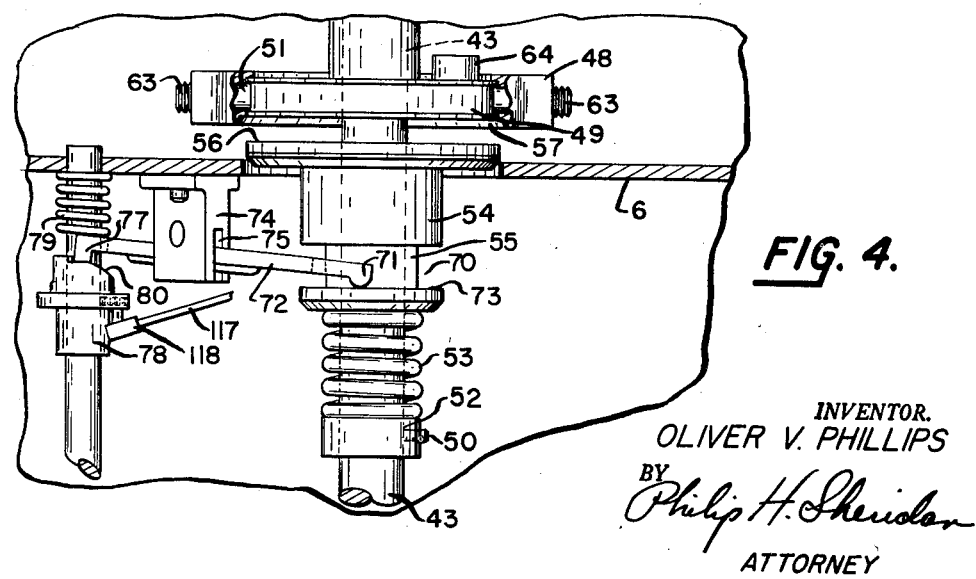
INVENTOR.
OLIVER V. PHILLIPS
ATTORNEY

United States Patent Office 2,860,509
Patented Nov. 18, 1958

2,860,509

RECORDING APPARATUS FOR EARTH BORE DRILLING

Oliver V. Phillips, Littleton, Colo., assignor to The Star Recorder Corporation of Denver, Denver, Colo., a corporation of Colorado Application October 18, 1954, Serial No. 462,833

14 Claims. (Cl. 73—151.5)

This invention relates to a recording apparatus for use with earth bore drilling equipment whereby information as to the drilling operations and depth being drilled may be permanently recorded, all in relation to or correlated with time.

As is well known to those engaged in and familiar with earth bore drilling, many operations take place in addition to drilling, such as changing of drill bits, adding sections of drill pipe, reaming and many others. It is not only desirable to have or obtain a permanent and complete record of the rate of penetration when drilling, but also a record of all of the various other operations taking place, and preferably such records should indicate time consumed in conducting the operations and drilling. The advantages of having such a complete record should be apparent as it permits the operator to analyze the entire operations, to help determine whether the earth strata being drilled is hard or soft, to ascertain the cost per time unit each day of the drilling and to study the efficiency of the crew.

In providing an apparatus capable of making such a complete record, cable means or the like must be directly associated with the drilling stem and the apparatus whereby the cable means will truly and accurately reflect the movement of the drilling stem. Yet at the same time sufficient play must be permitted between the cable means and certain parts of the apparatus to account for the usual jerking or jarring and uneven pulling or lowering of the drill stem.

With the above in mind, it is one of the objects of this invention to provide an improved recording apparatus for a well drilling rig which will give a complete permanent record of the depth, the rate of penetration of the drilling bit and also a record of other important operations performed during drilling, including the period of time consumed and also the date and hour thereof.

Another object of the invention is to provide an apparatus of the type described having a measuring wheel over which a cable connected in tension with the drilling stem is trained, a stylus for marking on a chart the drilling depth with relation to time and improved clutch means for connecting the measuring wheel and stylus during drilling and permitting disconnection during other operations of the type enumerated.

Yet another object of this invention is to provide an apparatus of the type described including a measuring wheel over which a cable connected in tension with the drilling stem is trained, a first stylus for marking on the chart the drilling depth with relation to time and a second stylus for marking on the chart other operations than drilling depth, clutch means for connecting and disconnecting the wheel with the first stylus and improved means associated with the clutch means for effecting operation of said second stylus to record the other operations when said wheel is disconnected from the first stylus by the clutch means.

A further object of the invention is to provide a recording apparatus having a driving member adapted for connection with the traveling block of the drilling rig, a drilling depth or penetration pen and an operations pen for marking a chart whose movement is correlated with time, and improved clutch means for connecting the driving member to operate the pens, said clutch means and linkage associated therewith being arranged when drilling to lock movement of the operations pen and permit movement thereof when drilling ceases so that the operations pen may indicate on the chart indicia representing operations taking place other than drilling.

Still a further object of the invention is to provide apparatus of the type described in the preceding paragraph having improved means for positioning the clutch in clutch engaging or disengaging positions with respect to the penetration stylus.

Still another object of the invention is to provide apparatus of the type described in the penultimate paragraph wherein means is provided for permitting a limited amount of play between the driving member and the clutch means.

Finally, it is an object of the invention to provide an improved apparatus of the type described which is durable, is simple to construct and operate, is composed of a minimum of parts and is efficint in operation to provide an accurate and complete record of well drilling operations in correlation to time.

Other objects and advantages of the invention will become apparent upon considering the following detailed description in conjunction with the drawings wherein:

Figure 2 is a view of a portion of a chart or log sheet employed with the apparatus;

Figure 4 is a detailed view showing the clutch of the apparatus in disengaged position;

Figure 5 is a sectional view taken along the lines 5—5 of Figure 3;

Figure 6 is a sectional view taken along the lines 6—6 of Figure 3;

Figure 7 is a detailed view of some of the linkage shown in Figure 6 when in the "out" position;

Figure 1:
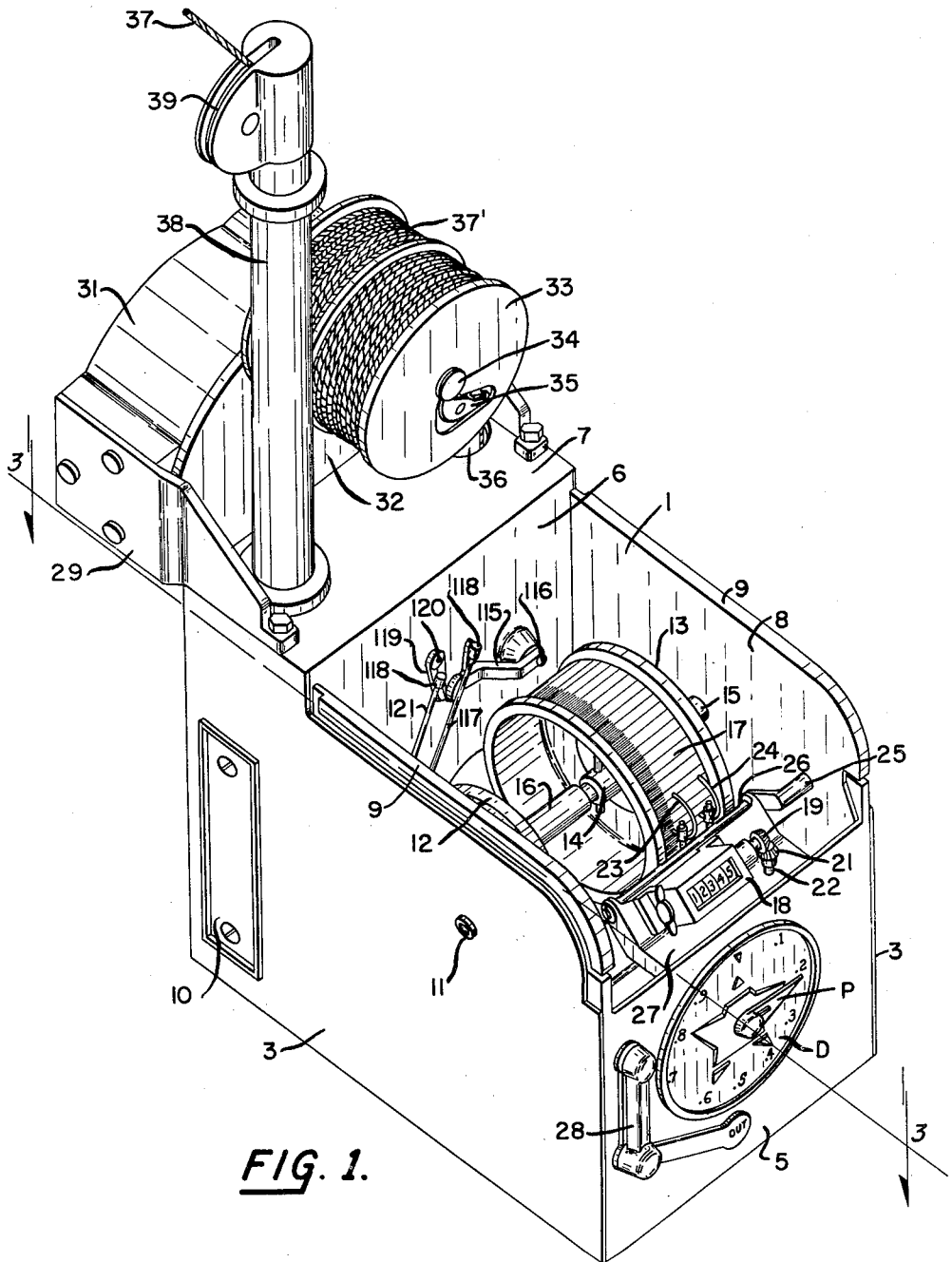
Figure 1 is a perspective view of the recording apparatus.

Referring to the drawings in detail wherein like numerals indicate similar parts throughout, a brief description of the major parts of the device, as shown in Figure 1 in particular, will now be given. Numeral 1 generally represents the entire recording apparatus and this structure includes a housing, preferably cast from suitable metal having a base or bottom wall 2, side walls 3, a rear wall 4, a front wall 5 and a partition 6 between the side walls. A partial top or cover wall 7 is provided between rear wall 4 and partition 6 and the side walls 3 are each provided with suitable bracket members 8 having rails or the like 9 which are adapted to support a removable cover, not shown. This cover is preferably provided with a transparent opening so that certain parts of the apparatus may be examined during operation. One of the side walls 3 is provided with a removable portion or inspection door 10 to provide access to the interior of the apparatus between walls 4 and 6. Numeral 11 represents an opening for receiving a winding key to wind the clock 12 and this clock is of standard construction, commonly employed with well drilling equipment, and preferably consists of a timing device that is timed for twelve hour rotation on twenty-four hour winding intervals and, by itself, since it is a well known piece of equipment, forms no part of this invention.

A suitable chart drum is illustrated by numeral 13 and this drum includes a conventional spring loader plunger assembly 14 whereby the drum may be detachably connected between bearing 15 and clock shaft 16 for rotation with the latter. A time sheet or log chart 17, the preferred type of which will hereinafter be described in detail, is positioned on drum 13 and is held thereon for rotation therewith by spring biased hooks or the like, not shown.

A standard counter, calibrated to indicate feet, is shown at 18 and the counter is driven, as shown, by drive gear 19 which meshes with vertical drive shaft gear 21 on vertical drive shaft tube 22. D represents a dial for visual footage indication and this dial is calibrated in tenths of a foot, whereby one revolution is made per foot of hole drilled and the counter registers the number of rotations of the dial pointer P.

A penetration stylus or pen is illustrated at 23 and an operations stylus or pen is shown at 24, both pens being urged by suitable screw means, not shown, to normally engage and mark chart 17. Numeral 25 represents a pen releasing lever for rotating a pen releasing shaft 26 to disengage the pens from the chart, shaft 26 being journaled, by suitable means, in a bracket 27 preferably cast to front wall 5, and it is to be noted that the counter 18 is also integrally mounted on bracket 27 by suitable standard structure. An "in" and "out" lever 28 is mounted by suitable means on the exterior of wall 5 on shaft 30 journaled for rotation on housing portions 5 and 6.

Extending rearwardly of the apparatus 1, but integrally therewith, are brackets 29 on which is mounted by suitable means a housing 31 having a detachable cover 32, both the housing and cover being preferably of cast metal. Within this housing is provided a spring motor which is described and shown in detail in my patent application entitled "Tension Apparatus for a Cable Used With Recording Apparatus for Earth Bore Drilling," Serial Number 462,834, which is being filed concurrently herewith. Numeral 33 represents a take-up, metering wheel or retrieving reel assembly mounted on a pinion shaft 34 and locked thereon against longitudinal movement by dog 35 and, of course, the reel 33 rotates with shaft 34 which is controlled by the spring motor within housing 29.

Figure 8:
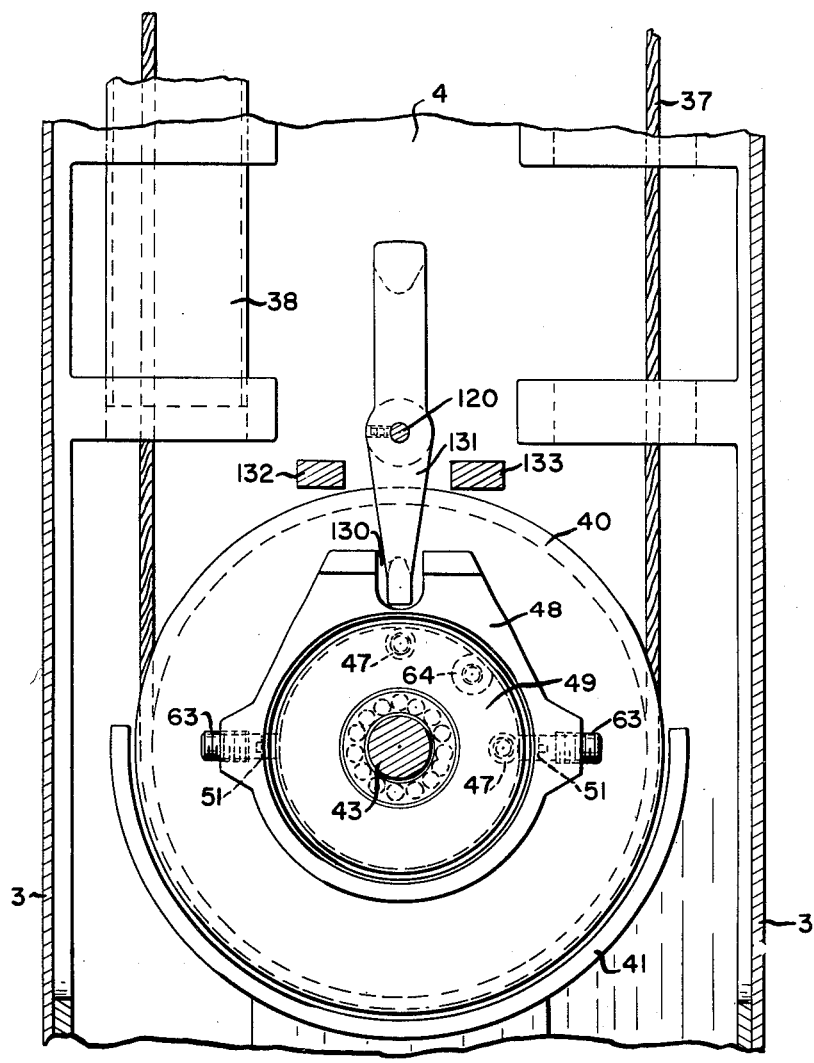
Figure 8 is a sectional view along the line 8—8 of Figure 3.

Each take-up reel is capable of letting out or taking up approximately 180 feet of cable and the spring motor keeps the cable tight at all times when it is connected to the traveling block of the drilling equipment, as is clearly explained in my said co-pending application. Cable 37' is a spare and cable 37 passes through opening 36 in wall 7 and is trained over a main drive consisting of a measuring wheel or sheave 40, having a cable guide 41, as shown in Figure 8, and thence up through the vertical guide tube 38. This latter tube is rigidly and integrally mounted on wall 7 by any suitable means and at its upper end includes a pulley 39 over which the cable passes and from this point the cable is connected to the traveling block of the drilling rig. In other words, the cable 37 is hooked up with the drilling equipment so the exact movements of the drilling string are reflected in the cable 37.

Figure 9:
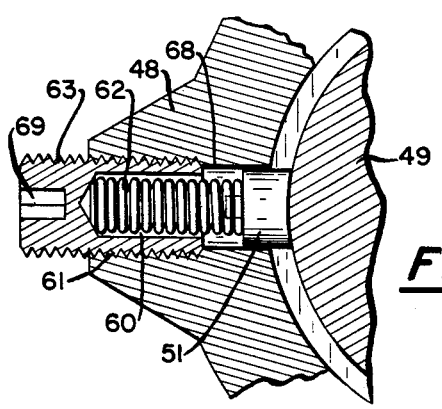
Figure 9 is a detailed sectional view of a portion of the drag assembly ring.
Figure 3:
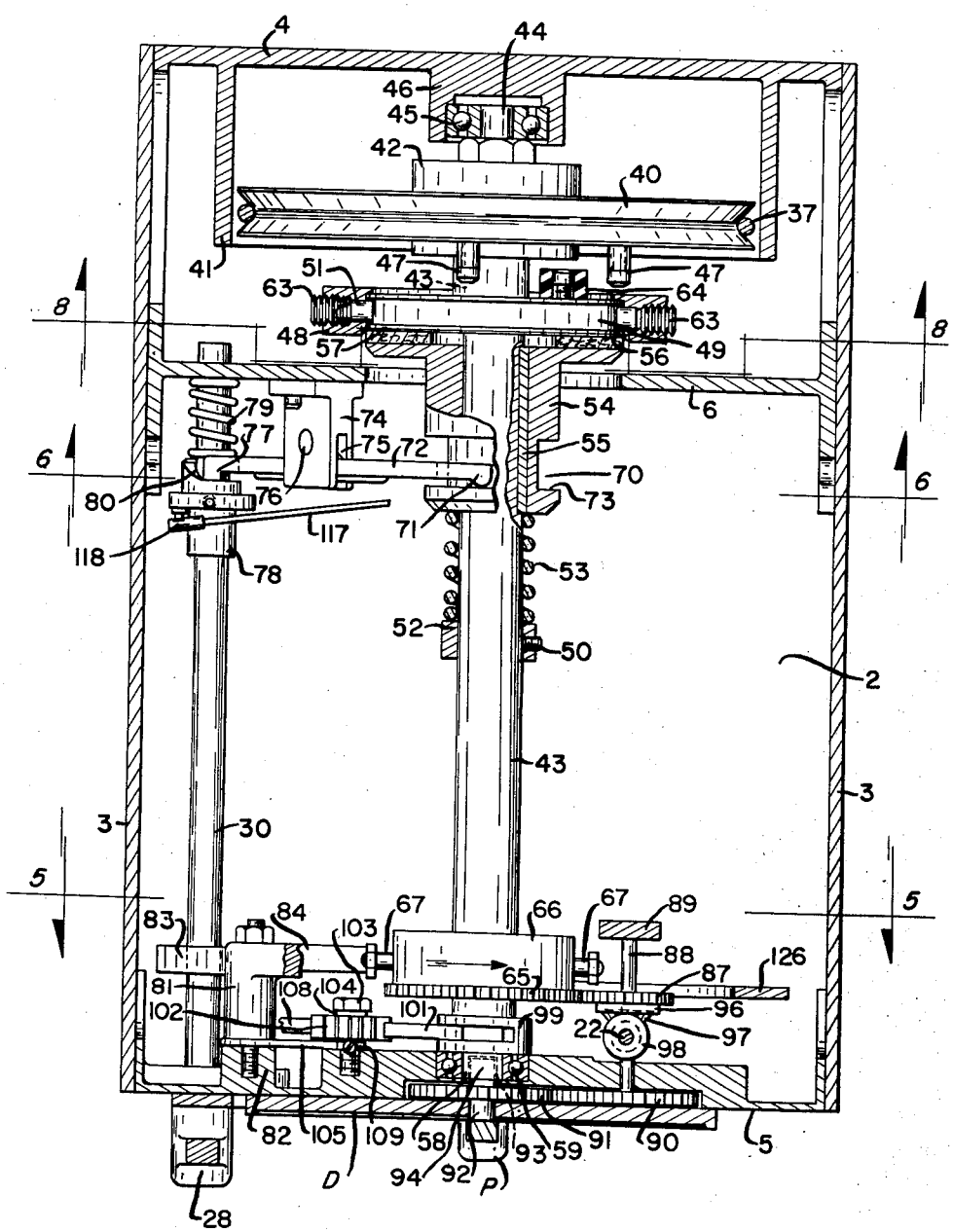
Figure 3 is a sectional view taken along the lines 3—3 of Figure 1.

Now referring in detail to the features of this invention, means is associated with the measuring wheel 40 to operate the pointer P and counter 18, as well as stylus 23, and this means will hereinafter be described. As shown in Figure 3, wheel 40 is mounted on hub or journal 42 for free wheeling on shaft 43, the latter being varied in size throughout the assembly. A reduced end 44 of shaft 43 is journaled in ball bearings 45 positioned in the socket of cast extension 46 which is integral with the back cover or wall 4. Wheel 40 has extending from one side thereof projections 47 and these projections are positioned a predetermined distance apart about the circumference of wheel 40 for reasons that will be apparent hereinafter, and it is to be noted that each of these stops is threadedly positioned on wheel 40 so that the distance they extend therefrom may be varied. Numeral 48 represents a drag assembly ring mounted on a clutch face plate or driven member 49, journaled for free rotation about shaft 43 as shown in Figure 8, said ring being frictionally held in position on plate 49 by drag buttons or brushes 51, preferably made of Formica. As illustrated in Figure 9, the buttons 51 are spring pressed against plate 49 by means of spring 62, the latter being positioned for the most part within sockets 60 provided in plugs 63. As is readily apparent from Figure 9, these plugs are threadedly connected at 61 in bores 68 provided in the assembly ring 48. The friction caused by the buttons 51 engaging plate 49 may be varied by turning plug 63 manually or by so turning the plug with a screwdriver or the like inserted in slot 69. Accordingly, the setting of plugs 63 determines how much force is required to overcome the frictional drag between buttons 51 and plate 49 and thereby permit movement or rotation of plate 49 with respect to and independent of ring 48. It is to be noted that plate 49 has one or more rubber stops or bushings 64 extending therefrom in the direction of wheel 40 and the stop shown is to be engaged by projections 47, as will be hereinafter explained, to provide co-engageable or cooperating means for causing corresponding movement of both the drive member 40 and plate 49.

Numeral 54 represents the clutch body and this body is keyed for rotation to main shaft 43 by key 55, but said key permits longitudinal movement of body 54 with respect to shaft 43, and numeral 56 illustrates the clutch facing which is made out of cork or other similar material. As is shown in Figure 3, the clutch face 56 engages face 57 of plate 49 and is to be driven thereby when in this position. Also keyed for movement only with shaft 43, by suitable means such as a screw 50, is a clutch spring collar 52. Between the collar 52 and body 54 there is provided a clutch spring 53 and this spring functions to normally urge the face 56 into clutch engagement with the face 57 of plate 49.

Referring to the front end of shaft 43, its reduced end portion 58 is mounted for rotation on bearings 59 positioned within the front wall 5. It will be noted that a footage pawl main gear 65 is mounted for rotation with shaft 43 by means of hub 66 mounted integrally thereon and extending from hub 66 at diametrically opposed points are footage pawl screws 67. These bolts or screws may be screwed into hub 66 or otherwise adjustably connected thereto so that the distance that the head of the bolts extends from hub 66 may be adjusted, if desired, and the reasons for this will become apparent.

Now again referring to clutch body 54, there is provided therein a groove 70 for receiving the bifurcated or forked ends 71 of clutch throw-out fork 72 and the ends 71 are always in engagement with face 73 of the clutch body, as is illustrated in Figures 3 and 4. The fork 72 is pivotally mounted on clutch throw-out pillar block 74, which is also bifurcated at 75 whereby the fork 72 may be pivoted thereto as illustrated at 76. The other end of fork 72 is also bifurcated, as at 77, and the ends 77 always engage the clutch cam 78, the latter being keyed to only rotate with shaft 30 by any suitable means. To insure that ends 77 are in engagement with cam 78, a spring bias 79 is applied between partition 6 and the cam 78 and it is to be noted that since the "in" and "out" lever 28 is integral with shaft 30, the shaft 30 rotates an amount equivalent to the distance between "in" and "out" positions of lever 28 when the lever is moved from one position to the other. The cam face is illustrated at 80 and it is the contour of this face which controls the pivoting of fork 72 as illustrated in Figures 3 and 4. Therefore, when the "in" and "out" lever is positioned as shown in Figure 1, namely, in the "in" position, the forked ends 77 appear as illustrated in Figure 3, but when the lever 28 is moved to the "out" position, the cam face 80 causes the fork 72 to pivot until the parts appear as in Figure 4 and in this position the clutch face 56 is separated or spaced from plate 49 and there is thus no rotation of shaft 43.

However, referring to the "in" position again, the parts appear as in Figures 3, 5 and 6. Stylus 23 is mounted as shown in Figure 5 on footage arm 81, the latter in turn being pivotally mounted on a cast extension 82 of the front wall 5 of the apparatus as illustrated in Figure 3. Depending from arm 81 and integral therewith is a leaf spring 83 and the lower end of this leaf spring rides over and engages shaft 30 as illustrated in Figure 5. The purpose of spring 83 is to maintain pressure on arm 81 so that pen 23 will be urged and normally maintained in the position shown in Figure 5. Also extending from arm 81 is a second leaf spring 84 which is of sufficient length that it interferes with movement of pawls 67 thereby. When the hub 66 is rotated in a direction shown by the arrow thereof at each 180 degree movement of the hub 66, a pawl 67 engages spring 84 and pivots arm 81, whereby pen 23 will be moved a predetermined distance to the left when viewed from the front of the apparatus or to the right when viewed as in Figure 5. Referring to Figure 2, pen 23 normally indicates a line on the chart 17 similar to line 85, but every time a pawl 67, due to rotation of the hub 66 in the direction of the arrow, engages spring 84, a line 86 to the left is drawn on the chart. Since the hub 66 is arranged so that every 180 degrees of rotation is equivalent to one foot of drilling depth, the lines 86 indicate that one foot has been drilled and the chart also indicates at the left the time required or elapsed in drilling this amount.

Numeral 87 represents a horizontal drive gear mounted for rotation with horizontal drive shaft 88 journaled for rotation in housing 1 by any suitable means including housing portion 89. Also mounted on shaft 88 is a gear 90 which meshes with gear 91, the latter being keyed on shaft 92 which is connected integrally with pointer P. The reduced end 58 of shaft 43 is provided with a slot 93 which receives the end 94 of shaft 92 and functions to guide the latter shaft. Gears 87, 90 and 91 are of such size that rotation of gear 91 is equivalent to one foot of drilling depth. Accordingly, it can be appreciated that the pointer P, the dial D being calibrated in tenths of a foot, will indicate one foot of drilling upon each complete rotation of the pointer.

Numeral 96 represents the hub of gear 87 and also of beveled gear 97, the latter being adapted to mesh with a vertical drive shaft gear 98 mounted on vertical drive shaft tube 22. Gear 21 is mounted on shaft 22, as previously explained, and this latter gear drives gear 21 which operates the counter 18 and thus it can be understood that for each complete revolution of pointer P the counter 18 indicates one additional foot drilled. Accordingly, when the clutch is in engagement, wheel 40 has means associated therewith for operating the pointer of the dial D, the counter 18 and penetration pen 23, it being understood that throughout the drum 13 is operated by clock 12.

Also keyed for rotation with shaft 43 is a boss 99 to which is pivotally connected a pawl 101 for engaging a five pronged star wheel 102 journaled for free rotation on bolt assembly 103 extending from cover 5. The hub 104 of wheel 102 has a circular exterior surface, with the exception of a portion, not shown, which is flat. Extending integrally from arm 81, as shown in Figures 3 and 5, is a member 105 through which passes a bolt 109, the end of which engages and rides on hub 104. As previously explained, arm 81 is pivotally mounted and the engagement of bolt 109 with hub 104 limits the movement of arm 81 in one direction and the arm is continually urged in this direction by spring 83. Looking at Figure 5, pen 23 is normally stopped from moving further to the left than illustrated, but when the screw 109 engages the flat part of hub 104, pen 23 will move a further distance to the left to mark on the chart the lines 106. Pawl 101, which is biased by tension spring 107 illustrated in Figure 5, moves, during normal rotation, the star wheel against and sufficiently to overcome the action of leaf spring 108, this latter spring extending from side wall 3 and actually functioning to maintain the star wheel properly indexed. Since a complete rotation of pawl 101 is equivalent to two feet of drilling and since there are five prongs on the star wheel, lines 106 will commence to be drawn upon the drilling of every ten feet and continue so marking chart 17 until bolt 109 leaves the flat portion.

In the event hub 66 is rotated in the reverse from that shown by the arrow, spring 84 may be flexed, due to the construction of spring 84, by members 67 without pivoting arm 81, and similarly the pawl 101 may move past the prongs of the star wheel 102 without rotating the wheel, and this latter action is insured as pawl 101 pivots and spring 108 maintains the wheel 102 positioned.

Again referring to Figure 2, there is illustrated a portion of a chart 17 having recordings thereon indicating rate of penetration and other operations with respect to time, these recordings taking place between 2:30 p. m. and 4:15 p. m. It is to be understood that both the penetration pen 23 and the operation pen 24 are arranged to continually mark the chart and when there is drilling penetration, pen 23 indicates the vertical lines 85 and substantial lateral lines or markings 86 and 106, while pen 24 marks line 111 and when the other operations are taking place, pen 23 merely indicates a straight line 85 with no lateral markings. Assuming there is drilling penetration and lever 28 is in the "in" position, each foot of drilling will be indicated by the lines 86 at acute angles to the vertical line 85 and this operation is caused, as previously explained, by one of the pawls 67 engaging spring 84. The lines 86 are formed for each revolution of the pointer P and, of course, the dial D will indicate the fraction of footage being drilled. Every 10 feet of drilling will be further indicated by the lines 106 which form an oblique angle with line 85, the operation being brought about by means of pawl 101 and star wheel 102, as previously explained.

When drilling ceases and the clutch is disengaged by moving lever 28 to the "out" position, operations pen 24 is moved to the right, as viewed from the front of the instrument, and thereafter various operations of the type previously enumerated may take place. When no such operations are being conducted but the clutch is disengaged, pen 24 will indicate line 111 on the chart and when the other operations do take place and cause the drill stem to be moved downwardly or upwardly, lines 112 and 114 will be indicated by pen 24, due to the structure hereinafter explained, and it is to be noted that all of these markings on the chart are correlated with time.

Referring to Figures 3, 4, 6 and 7, when the lever 28 is in the "in" position the parts are as illustrated in Figures 3 and 6 and when the lever is in the "out" position they are as illustrated in Figures 4 and 7. In other words, rotation of shaft 30 by movement of lever 28 from the "in" to the "out" position causes movement of the following parts due to movement of cam 78.

A reversing stop arm 115 is pivotally mounted by means 116 on wall or partition 6, and connected to arm 115 by suitable connection means is a reversing stop linkage 117, the latter in turn being connected to cam 78. Such suitable connection means is represented by numeral 118 and preferably consists of a spring pressed plunger of one part engaging a ball of the other part so that the connection is detachable. Keyed to a shaft 120 journaled in wall 6 is a reversing part lever 119 which is connected with an operation pen linkage 121. The other end of linkage 121 is connected to dog 122 which is keyed for rotation with shaft 123, said shaft being journaled for rotation between partition 6 and portion 5 of the housing. Also keyed to shaft 123 is, as shown in Figure 5, a dog 124, the latter having linkage 125 connected thereto and to the operations pen arm 126, the latter being connected to operate pen 24 and pivotally mounted to the wall 5 by means 127. When the parts are positioned as shown in Figure 6 with the lever 28 in the "in" position, the operations pen arm 126 is as shown in Figure 5 and the pen 24 will be in position to mark the chart with line 111. However, when the lever 28 is changed to the "out" position, shaft 123 will be rotated, as is apparent, and this in turn will pivot operations pen arm 126 to the left when viewed at Figure 5 and at the end of this pivotal movement pen 24 is in position to mark the chart with line 112.

The stop arm 115, when positioned as in Figure 7, insures that the pen 24 cannot move to the left of line 112 on the chart when viewed from the front of the apparatus 1. Now, again referring to the measuring wheel 40 and the ring 48, there is provided a slot 130 in ring 48, as illustrated in Figure 8, for receiving one end of a lever 131 keyed for rotation with shaft 120, the latter being free to rotate in partition 6. It will again be noted that reversing part lever 119 is also keyed to rotate with shaft 120 and further the partition 6 is provided with integral stops 132 and 133 which limit the pivotal movement of lever 131. When the lever 131 strikes either of the stops 133 or 132, ring 48 is prevented from further rotation with plate 49 as the stops overcome the frictional drag of plungers 51.

When drilling is taking place, ring 48 is moved until lever 131 engages stop 133 and thereafter the pen 24 is arranged to mark only 111 on the chart as the stop 133 prevents further movement of the lever 119. It should be pointed out that by "thereafter" is meant continued drilling in the well bore and it should also be kept in mind that the projections 47 and stop 64 are so positioned that measuring wheel 40 will have a limited amount of free play, even during drilling, whereby the remaining parts of the apparatus will not be affected and this is necessary, due to the usual jarring and jolting of the drill stem.

When the lever 28 has been thrown to the "out" position, as previously stated, the parts assume the position shown in Figure 7 and the stop arm 115 insures that lever 119 will be moved only an amount corresponding to the distance of travel of lever 131 from its central position until it engages stop 132. The movement of lever 131 between the stop 132 in its central position causes, as should be apparent, the lines 113 and 114 on the chart, line 113 indicating that the traveling block or drill stem is being moved upwardly and line 114 indicating movement downwardly while the operations other than drilling are taking place. Here again, ordinary jarring will be taken care of due to the free play of wheel 40.

As previously indicated, the most important features of the present invention reside in the simple construction of the effective clutch means which includes body 54, ring 48 and plate 49 and the parts associated therewith and the construction of the clutch disengaging means including the double bifurcated member 72. The operation of the apparatus should be clear as it has been described in connection with the overall detailed description, but to repeat briefly, the cable 37 is connected with the traveling block of the drilling equipment and when drilling, the clutch means is as shown in Figures 3 and 6 with lever 28 in the "in" position. Accordingly, lines 85, 86, 106 and 111 will be noted on the chart 17. When drilling ceases, lever 28 is moved to the "out" position and the parts appear as in Figures 4 and 7, whereupon the operations taking place, other than drilling, may be analyzed by the lines 112, 113 and 114, all markings on chart 17 being correlated with time. Accurate recordings are made on the chart, not only due to the cable tension means, but because of the clutch means structure permitting proper rotation of shaft 43 when drilling and conversion to "in" or "out" positions of lever 28.

In the "in" position of Figure 6, it is to be understood that stop arm 115 is positioned to permit free movement in an arc of lever 119, the amount of movement being limited by stops 132 and 133. Actually, in the "in" position of Figure 6, lever 119 is shown as being at substantially the middle of the arc. It should also be mentioned that stops 132 and 133 could be positioned so that the end of lever 131 above shaft 120 is arranged to engage the stops and this positioning of the stops might be preferable. Also, shaft 30 should be journeled in wall 5 and partition 6 so that no longitudinal movement of the shaft between wall 5 and partition 6 is permitted.

It is to be understood that the recorder disclosed is merely an example of the preferred embodiment of the invention and that modifications are possible in the particular structure without departing from the fundamental principles of the invention. Although the recorder is shown as having a special use, its principles may be used in recorders for other purposes. Thus, being aware of these possible modifications and uses, I desire it to be understood that the scope of the invention is not to be limited except in accordance with the terms of the appended claims and equivalents thereof.

What is claimed is:

1. A recorder for an earth bore drilling apparatus having a drilling stem, said recorder comprising a recording chart sheet, time means for moving the sheet at a predetermined rate in one direction of travel, a main drive member for the recorder connected to be driven by vertical movement of the drill stem, an element for marking the chart sheet as it moves and when drilling is occurring, first means for operating the element to indicate the amount of drilling with respect to time, other marking means for the chart to indicate on the chart the direction of movement of the drill stem, second means including said main drive member for operating said other marking means, clutch means between the main driving member and said first operating means for setting up a connection for driving relationship of the member and first operating means, said second operating means being permanently set up with such a connection, and means without interfering with the continued operation of said second means for disengaging the clutch means upon the ceasing of drilling, said last named means including a lever operated shaft, cam means on the shaft and a pivotally mounted member positioned between and engaging the cam means and the clutch means.

2. Apparatus as defined in claim 1 wherein said pivotally mounted member is provided on both ends thereof with bifurcations, said clutch means including a body provided with a groove, one set of bifurcations being positioned in said groove and engaging the clutch body and the other set of bifurcations being positioned to engage the cam means.

3. A recorder for an earth bore drilling apparatus having a drill stem, said recorder comprising a recording chart sheet, time means for moving the sheet at a predetermined rate in one direction of travel, a main drive member for the recorder connected to be driven by vertical movement of the drill stem, a shaft, a driven plate member, said drive member and driven member being mounted on the shaft, co-engageable means between the plate member and the drive member for setting up a connection to cause upon movement of said drive member corresponding movement of the plate member, a first element operated by means including said shaft and driven member for marking the chart sheet to indicate drilling penetration with respect to time, other marking means for the chart to indicate on the chart the direction of movement of the drill stem, a ring frictionally mounted on said plate member for movement therewith, and means connecting the ring and other marking means for actuating the latter upon movement of said ring.

4. Apparatus as defined in claim 3 wherein said last named means includes a second shaft connected with said other marking means, a lever keyed for rotation therewith, and means connecting said lever for operation with said ring.

5. Apparatus as defined in claim 4 wherein stop means is provided for limiting the amount of movement of said lever and in turn said second shaft, the frictional force between said ring and plate member being overcome when said lever engages said stop means whereby the plate member may be moved independently of said ring.

6. Apparatus as defined in claim 3 wherein spring pressed plungers are provided for frictionally holding said ring on said plate member.

7. Apparatus as defined in claim 3 wherein there is provided means including a clutch body for disengaging the operating means of the first element when drilling ceases.

8. Apparatus as defined in claim 7 wherein said clutch body and plate member have cooperating faces when the operating means of the first element is in operation.

9. Apparatus as defined in claim 8 wherein the means for disengaging the operating means of the first element includes a lever operated shaft having cam means integral therewith and a pivotally mounted member for engaging the cam means and clutch body.

10. Apparatus as defined in claim 4 including a second lever keyed for rotation with said second shaft and a stop arm adapted to be actuated to limit the amount of movement of said levers.

11. A recorder for an earth bore drilling apparatus having a drill stem, said recorder comprising a recording chart sheet, a shaft, a plate member having an annular face mounted on the shaft and connected to be driven by vertical movement of the drill stem, marking means for the chart to indicate on the chart the direction of movement of the drill stem, an annular ring encircling the plate member and frictionally mounted on said face of the plate member for movement therewith, and means connecting the ring and marking means for operating the latter upon movement of said ring, said last named means including a second shaft mounted for rotation and connection with said marking means, a lever keyed to said shaft, and means connecting said lever for operation with said ring.

12. Apparatus as defined in claim 11 wherein stop means is provided for limiting the amount of movement of said lever and in turn said second shaft, the frictional force between said ring and plate member being overcome when said lever engages said stop means whereby the plate member may be moved independently of said ring.

13. As a subcombination in a drilling recording apparatus, a clutching mechanism comprising a shaft, a drive member journaled on said shaft, means for rotating said drive member an amount corresponding to movement of a first element, a driven member journaled on said shaft, cooperating means between the drive and driven members for causing, upon movement of the drive member, movement of said driven member, a ring-like member associated with said driven member, a second element connected for movement with said ring-like member, and stop means for limiting the amount of movement of said ring-like member, said ring-like member being frictionally mounted on said driven member whereby the ring-like member moves with said driven member until said stop means limits movement thereof.

14. As a subcombination in a drilling recording apparatus, a clutching mechanism comprising a shaft, a drive member journaled on said shaft and adapted to be rotated by a flexible line whereby the direction of rotation of the member is indicative of the direction of movement of said line, a driven member also journaled on said shaft, co-engageable means on the drive member and on the driven member for setting up a connection between the members to cause the driven member to be rotated by the drive member, an annular actuating element surrounding the driven member, friction means connecting the annular element with the driven member, whereby said annular element is rotated with the driven member so long as there is a force less than said friction means acting to resist movement of the actuating element, and stop means associated with said annular element for restricting the travel of said annular element to cause halting of the movement of the annular element, said friction means permitting continued rotation of the driven member after movement of the annular element has been halted.

References Cited in the file of this patent

UNITED STATES PATENTS

| | | |
|---|---|---|
| 294,672 | Proctor | Mar. 4, 1884 |
| 1,503,609 | Smith | Aug. 5, 1924 |
| 2,287,819 | Nichols | June 30, 1942 |
| 2,539,758 | Silverman | Jan. 30, 1951 |
| 2,546,980 | Collins | Apr. 3, 1951 |
| 2,682,078 | Brown | June 29, 1954 |